(12) United States Patent
Jagtman

(10) Patent No.: US 11,102,390 B2
(45) Date of Patent: Aug. 24, 2021

(54) VERSATILE VIEWING DEVICE

(71) Applicant: Optelec Holding B.V., Barendrecht (NL)

(72) Inventor: Sofieke Jagtman, Vught (NL)

(73) Assignee: Optelec Holding B.V., Barendrecht (NL)

( * ) Notice: Subject to any disclaimer, the term of this patent is extended or adjusted under 35 U.S.C. 154(b) by 0 days.

(21) Appl. No.: 16/210,006

(22) Filed: Dec. 5, 2018

(65) Prior Publication Data

US 2019/0182416 A1 Jun. 13, 2019

(30) Foreign Application Priority Data

Dec. 8, 2017 (EP) .................................... 17206163

(51) Int. Cl.
| | | |
|---|---|---|
| G02B 27/04 | (2006.01) | |
| H04N 5/225 | (2006.01) | |
| G09B 21/00 | (2006.01) | |
| H04N 5/232 | (2006.01) | |
| H04N 7/18 | (2006.01) | |

(52) U.S. Cl.
CPC ......... *H04N 5/23203* (2013.01); *G02B 27/04* (2013.01); *G09B 21/008* (2013.01); *H04N 5/2253* (2013.01); *H04N 5/23216* (2013.01); *H04N 7/181* (2013.01)

(58) Field of Classification Search
CPC .............................. G09B 21/008; G02B 27/04
See application file for complete search history.

(56) References Cited

U.S. PATENT DOCUMENTS

| | | | |
|---|---|---|---|
| 9,992,453 B2* | 6/2018 | Rodriguez | ........... H04N 5/2252 |
| 10,356,288 B2* | 7/2019 | Lin | .................... F16M 11/2064 |
| 2005/0040298 A1* | 2/2005 | Ohki | ..................... F16M 11/10 |
| | | | 248/176.1 |
| 2014/0176690 A1* | 6/2014 | Hamel | ................. G02B 27/026 |
| | | | 348/63 |
| 2015/0189160 A1 | 7/2015 | Auger et al. | |
| 2015/0215499 A1* | 7/2015 | Goldenberg | ......... G09B 21/008 |
| | | | 348/63 |
| 2017/0208226 A1* | 7/2017 | Zhang | .................... H04M 1/02 |

FOREIGN PATENT DOCUMENTS

| | | | |
|---|---|---|---|
| JP | 2003219213 A | * | 7/2003 |
| KR | 101 712 793 B1 | | 3/2017 |
| WO | 2016134260 A1 | | 8/2016 |

* cited by examiner

*Primary Examiner* — Kyle M Lotfi
(74) *Attorney, Agent, or Firm* — N.V. Nederlandsch Octrooibureau; Catherine A. Shultz; Katelyn J. Bernier

(57) ABSTRACT

An apparatus includes a frame, a screen supported by the frame for displaying an image; a first optical sensor for capturing an image, an extendable arm connected to the frame; and a second optical sensor connected to the arm for capturing an image. Such an apparatus can be used for capturing and displaying information for low vision persons.

15 Claims, 4 Drawing Sheets

VERSATILE VIEWING DEVICE

BACKGROUND

This invention relates to an apparatus to assist persons with impaired eyesight, low vision or other reading difficulties in reading, writing or viewing an object.

In assisting those with low vision or impaired eyesight to view an object or read text, it can be useful to employ magnification and/or image enhancement. This can be done through different types of devices ranging from a simple hand-held magnifying glass to a machine which employs a camera for capturing the object and a screen for displaying an electronic representation of the object. The electronic representation can show the image magnified, with better contrast, different colors, inverted text and/or different brightness.

Generally, in the type of machine which displays an electronic representation of the object, the object is placed on a support, in front of the camera. The object is then manually moved with respect to the support and the camera so that the camera captures different parts of the object, and the screen subsequently displays the part being captured. The magnification level can typically be changed, resulting in less of the object being displayed on the screen when a large amount of magnification is desired. When a large amount of magnification is required, the object has to be moved around a lot in relation to the support and the camera in order to view the whole object. Some prior art viewing devices are configured such that the device moves and not the object that is being viewed. This can be through wheels, slides or other means to view all parts of the object.

SUMMARY

According to a first aspect of the invention, an apparatus comprises a frame, a screen supported by the frame for displaying an image; a first optical sensor for capturing an image, an extendable arm connected to the frame; and a second optical sensor connected to the arm for capturing an image. Such an apparatus can allow for viewing and/or magnification of objects at different locations and distances from the apparatus. The extendable arm allows for capturing an object from the second optical sensor on the extended arm, allowing for the capture of a larger image space and for capturing at locations not directly in front of or behind the apparatus. This could allow for capture to the side of apparatus, promoting the capture of writing and/or capture of an entire standard size paper, for example, for use with optical character recognition.

According to an embodiment, the apparatus further comprises a third optical sensor connected to the apparatus, wherein the first optical sensor is configured for capturing an image near to the apparatus and the third optical sensor is configured for capturing an image at a distance from the apparatus. This can enable specific lenses to be used according to the range of each optical sensor, thereby providing a better capture and therefore better picture for display on the screen.

According to an embodiment, the arm is rotatably connected to the frame. Rotatable connection can allow for easy extension and placement of the second optical sensor above and/or to the side of the screen.

According to an embodiment, the arm is extendable to a use position such that the second optical sensor is positioned to capture an image to a side of the frame. This can be useful for capturing a user writing or for capturing something that is not flat, such as a large book.

According to an embodiment, the extendable arm can secure generally within the confines of the frame when not extended. This can be totally within the confines of the frame, or only partly, for example, a part is secured to a slot. This allows apparatus to compress into a compact size for transport or storage.

According to an embodiment, the first optical sensor is connected to a back surface of the screen or to a part of the frame positioned behind the screen. This can allow for capture of an image directly in line with the back of apparatus.

According to an embodiment, the apparatus is configured to be collapsible into a compact package. Optionally, the compact package comprises the frame collapsing to lie adjacent to the screen and/or a part of the frame; and the extendable arm being in a non-extended position to rest adjacent to the frame or screen. Further optionally, the compact package is substantially rectangular cuboid. Being able to collapse into a compact package ensures that the apparatus is able to be easily transported or stored without the need for a lot of space and with a reduced chance of damage while in transit or storage. This enables a user to take the apparatus to anywhere needed, making many more places an situations accessible for low vision persons.

According to an embodiment, the extendable arm extends with a slide.

According to an embodiment, the extendable arm is a length substantially equal to the length of the frame. Such a length would allow for the second optical sensor to be able to extend to a position quite a distance from the frame, and still allow for collapsing into a compact package for transport or storage.

According to an embodiment, the apparatus further comprises one or more speakers. These can be used for a number of functions, for example, to give audio feedback to a user.

According to an embodiment, the frame comprises a skid on each side of the frame extendable in front of the frame for supporting the frame on a surface such that the first optical sensor is positioned to display images of the surface between the two skids. This allows for each capture and display of information by the first optical sensor.

According to a further aspect of the invention, a method of manufacturing an apparatus for display information on a screen comprises connecting a screen to a frame such that the screen can be supported by the frame with respect to a surface; connecting a first optical sensor to the apparatus such that it can capture information to display on the screen; and connecting an extendable arm to the frame such that a first end can extend above and/or to the side of the frame, the first end comprising a second optical sensor. Such a method of manufacturing results in an apparatus that is able to capture and display images at a variety of different locations and/or distances from the apparatus in one compact device.

According to an embodiment, the step of connecting an extendable arm to the frame such that a first end can extend above and/or to the side of the frame comprises rotatably connecting a second end of an extendable arm to the fame such that a first end can extend above and/or to the side of the frame.

According to an embodiment, the method further comprises connecting the screen to the frame and connecting the extendable arm to the frame such that each can fold into a compact package.

According to an embodiment, the method further comprises connecting a third optical sensor to the apparatus.

Having a variety of optical sensors allows for use of a variety of different sensors to capture images according to the distance from the apparatus.

According to a further aspect of the invention, an apparatus for capturing and displaying information on a screen comprises a collapsible frame for supporting the screen in a working position; an extendable arm connected to the frame and which can extend away from the frame; and an optical sensor connected to the extendable arm. Such an apparatus allows for a versatile device that can be used for capturing and displaying information from a variety of locations and distances. A screen could be provided with the apparatus, or a tablet or other device with a screen could be connected to the frame for use.

According to an embodiment, the extendable arm rotatably connects to the frame on a second end and the optical sensor connects to the extendable arm on a first end.

According to an embodiment, the apparatus further comprises one or more further optical sensors connected to the apparatus for capturing information.

DETAILED DESCRIPTION

Figure 1A:
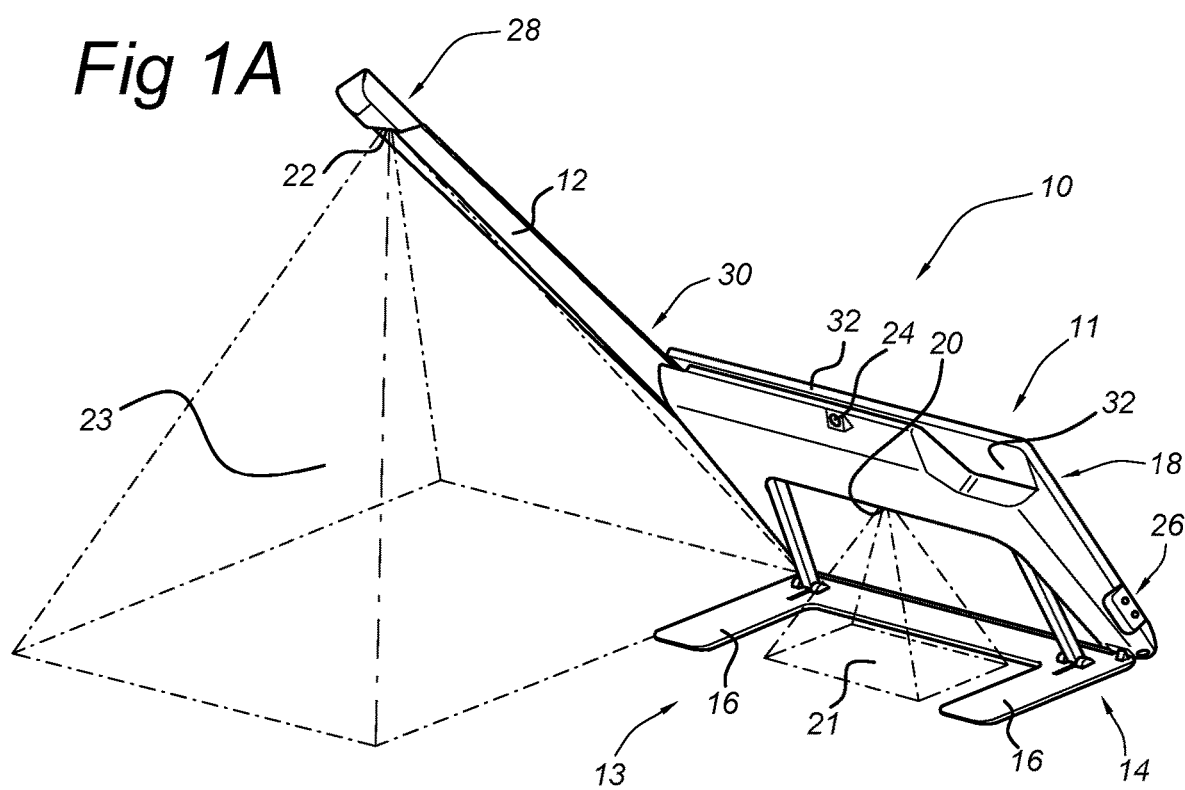
FIG. 1A shows a perspective back view of an apparatus for viewing an object with an extended arm.
Figure 1B:
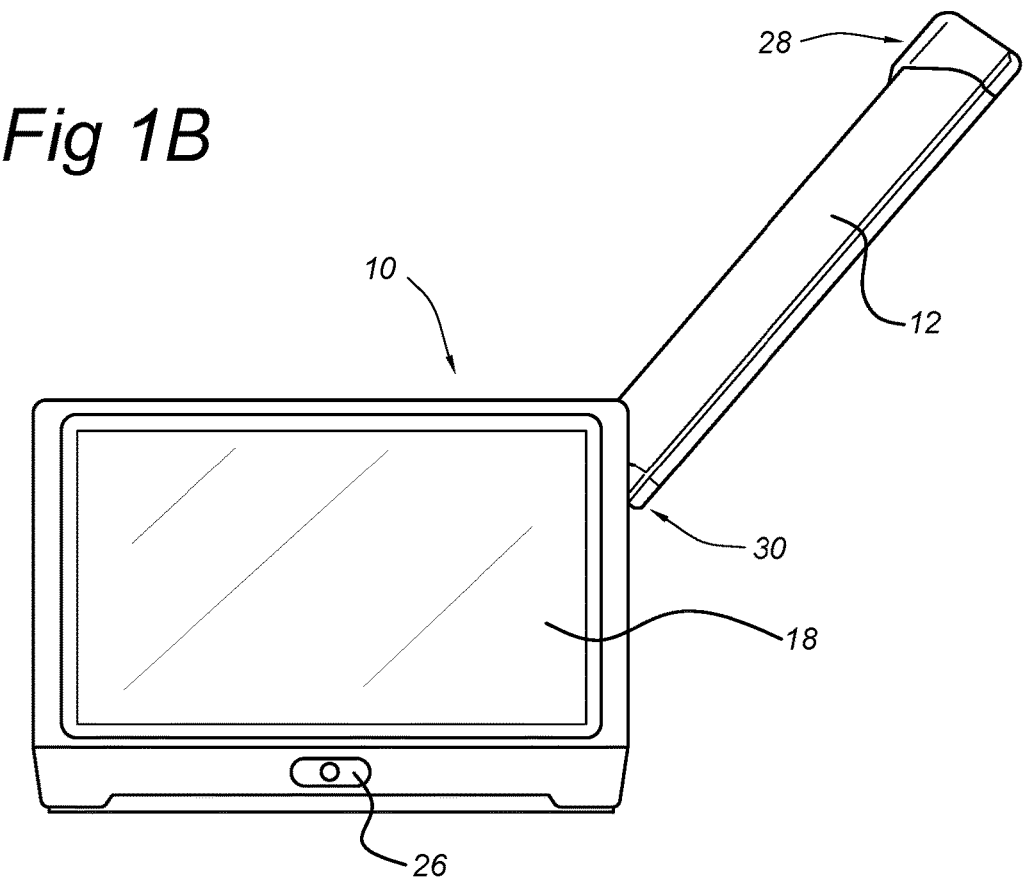
FIG. 1B shows a front view of the apparatus of FIG. 1A.
Figure 1C:
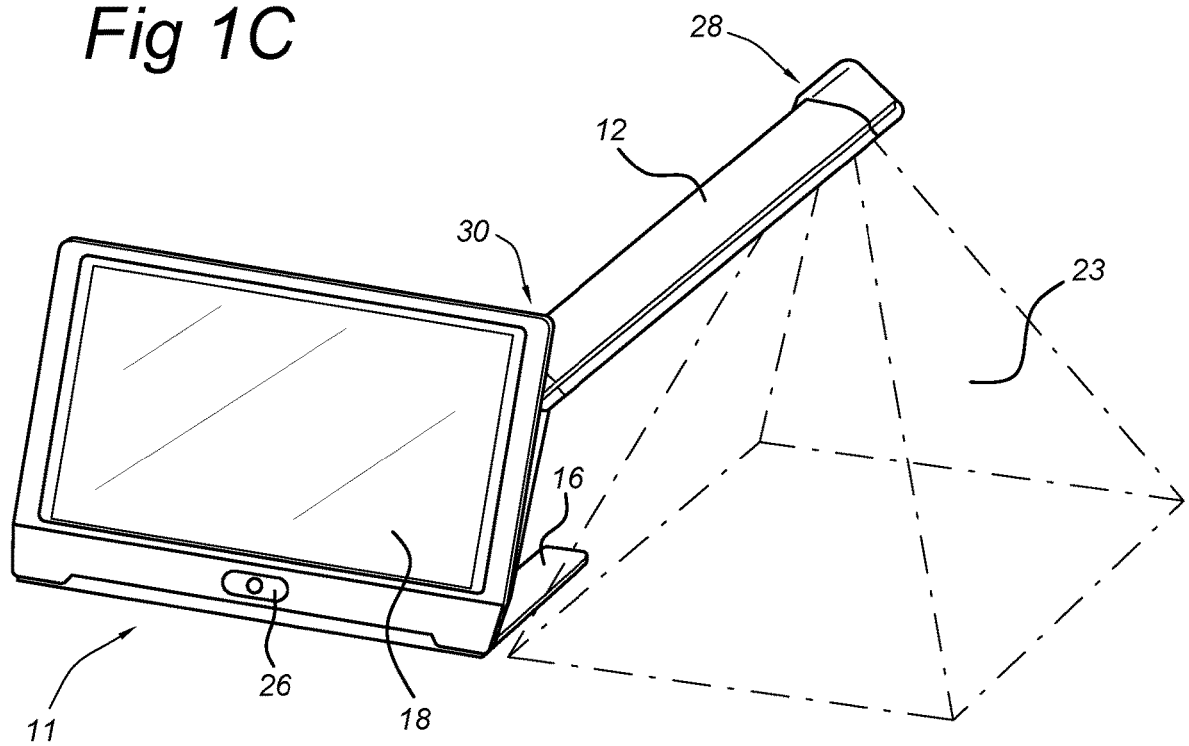
FIG. 1C shows a perspective view of the apparatus of FIG. 1A from a front side.

FIG. 1A shows a perspective back view of apparatus 10 for viewing an object with an extended arm 12, FIG. 1B shows the front side perspective view and FIG. 1C shows a front view of apparatus 10. Apparatus 10 includes front side 11 and back side 13, frame 14 with skids 16, screen 18, arm 12, first optical sensor 20 with viewing area 21, second optical sensor 22 with viewing area 23, third optical sensor 24 and control buttons 26. Arm 12 includes first end 28 and second end 30. Frame 14 includes slot 32 for securing arm 12 to frame 14.

Screen 18 can be integral to frame 14 or can be detachable from frame 14. In some embodiments, screen 18 can be integral with a tablet computer and/or be a touch screen. Screen 18 is large enough to display objects with a large amount of magnification, but small enough to be easily transportable, for example, seven inches (17.78 cm) to seventeen inches (43.18 cm). Apparatus 10 can include a cover or protection case (not shown), which can protect screen 18 when not in use.

First optical sensor 20 can be a camera connected to a back side 13 of apparatus 10, either to frame 14 or a back side of screen 18. In some embodiments, first optical sensor 20 could be connected to a plate or other attachment which is connected to frame 14 and/or screen 18. Optical sensor 20 could also be moveable and/or rotatable, though it is generally directed at the surface on which apparatus 10 rests to capture an object on that surface. As shown by viewing area 21, first optical sensor 20 captures the surface between skids 16, allowing easy viewing of anything put on that surface.

Second optical sensor 22 is connected to a first end 28 of extendable arm 12, though in other embodiments it may be at a different position of arm 12 or moveable along arm 12. Second optical sensor 22 can be a camera that is generally configured to be positioned to capture objects on the surface on which apparatus 10 rests. This could include to a side of apparatus 10 and/or from a greater distance than first optical sensor 22, perhaps enable the capture of an entire object, e.g., a standard A4 sheet.

Third optical sensor 24 can also take the form of a camera, and could also be connected to frame 14 and/or screen 18. Third optical sensor 24 can be for viewing objects at a distance. To enable this, third optical sensor 24 could be rotatable or movable in another manner such that it can be directed toward the object desired. The object at a distance could be, for example, a monitor, a blackboard or a whiteboard. Third optical sensor 24, could be especially useful for performing hobbies which could take place in front of apparatus 10.

Arm 12 is extendable from frame 14. In the embodiment shown, second end 30 of arm 12 is rotatably connected to frame 13, such that first end 28 can rotate to be located above and/or to the side of apparatus 10. In other embodiments, arm 12 could be connected to frame 14 and extendable in a different manner, for example, slidable. Arm 12 is of a length that is substantially equal to the length of frame 14, and can be secured to frame 14 through slot 32 when not in use.

Frame 14 includes skids 16, which extend in front of frame 14 for supporting frame 14 on a surface when apparatus 10 is in use. Skids 16 can fold in to a collapsed position, for example, by rotating when apparatus 10 is not in use (see FIGS. 3A-3B). Skids 16 can have a low-friction surface, for example, Polyoxymethylene ("POM"), and can have curved ends for easier sliding movement around and/or over a surface or an object to be viewed on screen 18.

Controller buttons 26 could take a number of different forms and be located at different places on apparatus 10. Control buttons 26 are typically large, easy to use buttons or switches which can perform various functions, such as turning apparatus 10 on or off, adjusting the screen 18 display and/or adjusting placement of optical sensors 20, 22, 24. In other embodiments, control buttons 26 could be other types of controllers, including but not limited to a slide, switch, knob or other device for controlling the apparatus 10, screen 18, and/or optical sensors 20, 22, 24. In some embodiments, for example when screen 18 is a touch screen, apparatus 10 may have minimal or no other control buttons 26.

Screen 18, optical sensors 20, 22, 24 and/or other components of apparatus 10 can be powered by batteries, for example located within frame 14 or screen 18, by a photovoltaic panel, by a plug-in power connection or by other means.

Apparatus 10 is a versatile device that can be used to capture and display objects using a number of optical sensors 20, 22, 24 and devices for properly orienting and positioning the sensors 20, 22, 24. First optical sensor 20 can be used for viewing an object directly in front of apparatus on a surface in viewing area 21. This can be used for magnifying and/or reading a documents, for example, a letter or a book. Skids 16 allow for easy placement of the object to be viewed by first optical sensor, and easy alignment and positioning of the object with respect to apparatus 10. Further, skids 16 allow for easy movement of apparatus 10 over an object viewed if needed. Third optical sensor 24 can be used for viewing something at a distance. Third optical sensor 24 includes a lens for distance viewing, and therefore ensures optimal capturing of the object which is desired to be projected on screen 18.

Second optical sensor 22 can be used by extending arm 12 to a position above and/or to the side of screen 18, such that it can capture viewing area 23. By positioning second optical sensor 22 above and/or to a side of screen 18, second optical sensor 22 is able to capture an image that first and third optical sensors 20, 24 could not reach. This could be used, for example, to position second optical sensor 22 such that the viewing area 23 could capture a standard size paper, for example A4. This could be used in combination with optical character recognition ("OCR"), and in some instances, apparatus 10 could then display the object on screen 18 and/or read the text which has been captured by second optical sensor 22 and gone through OCR. Second optical sensor 22 would have an appropriate lens to capture images on the surface from the distance from which arm 12 extends. In some embodiments, optical sensor 22 could be moveable along arm 12. Second optical sensor 22 could also be used for capturing a person writing or drawing to the side of apparatus 10, and then displaying on screen 18.

By having first, second and third optical sensors 20, 22, 24; apparatus 10 is able to be used to capture a variety of different objects at different locations and display a clear image on screen 18. A user is able to use apparatus 10 for viewing objects near, far and even for viewing one's own writing without needing to switch between devices. By including arm 12 with optical sensor 22, apparatus can easily be used for capturing pages for OCR or capturing images which are not directly in front of apparatus 10.

Figure 2A:
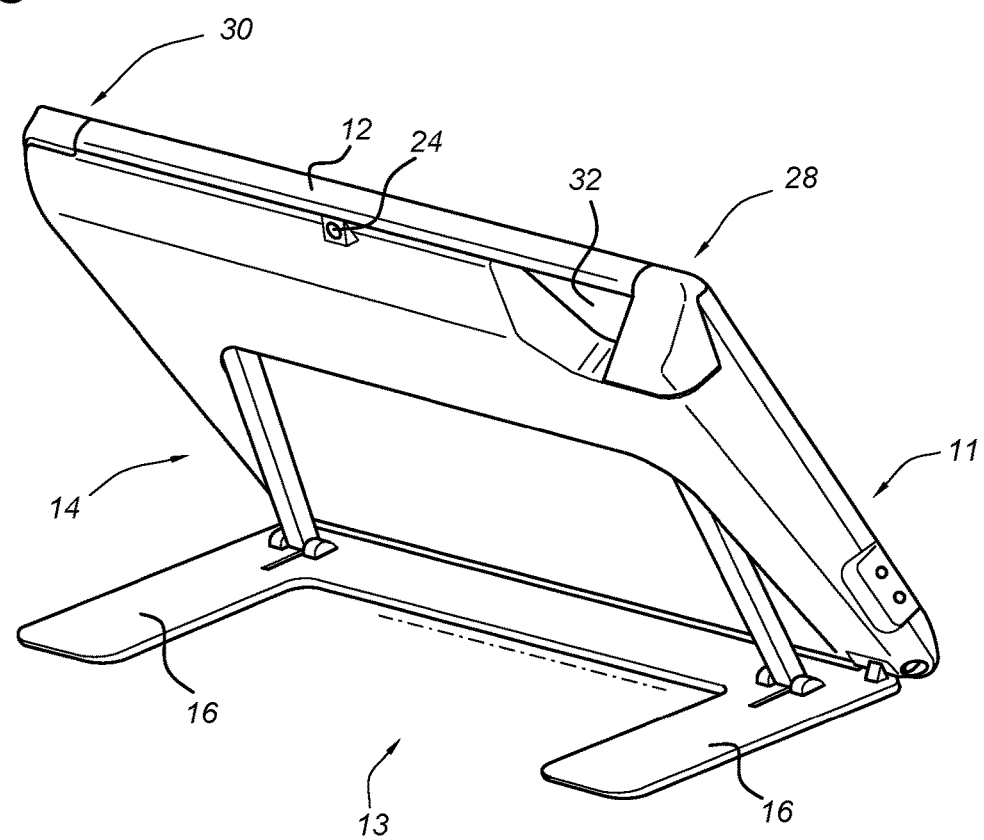
FIG. 2A shows a perspective view of the apparatus of FIG. 1A from a back side with the arm not extended.
Figure 2B:
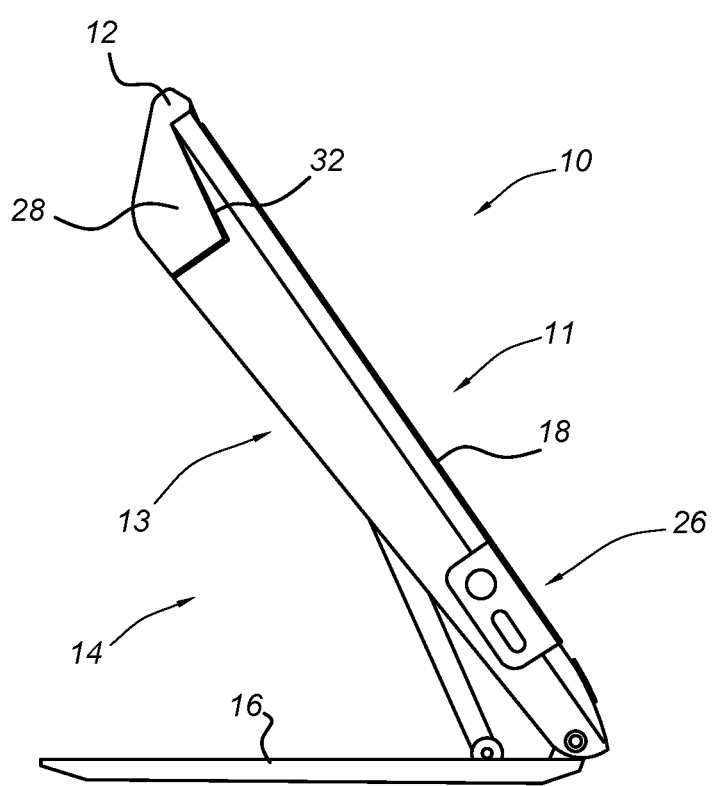
FIG. 2B shows a view of the apparatus of FIG. 2A from a first side.
Figure 2C:
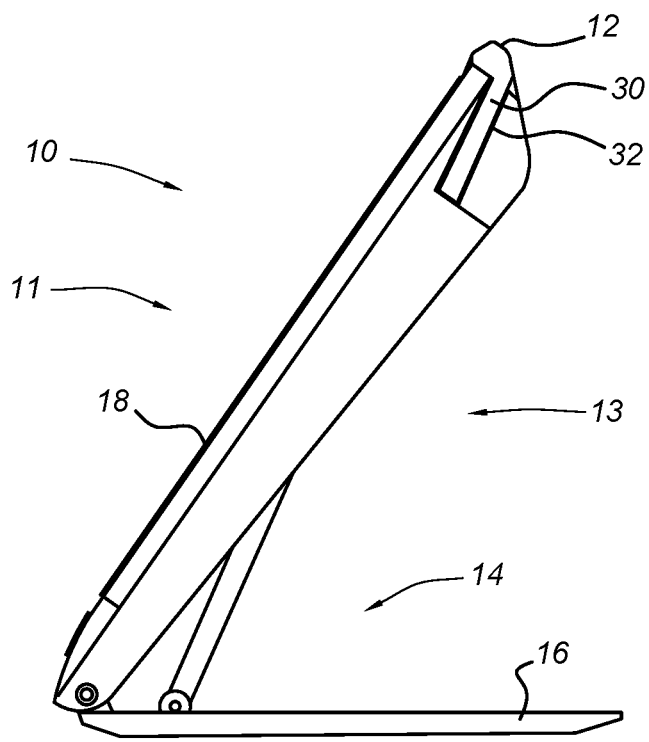
FIG. 2C shows a view of the apparatus of FIG. 2A from a second side.

FIG. 2A shows a perspective view of the apparatus 10 with arm 12 not extended, FIG. 2B shows a side view of the apparatus 10 of FIG. 2A from a first side, and FIG. 2C shows a second side view.

In FIGS. 2A-2C, arm 12 of apparatus 10 is not extended and rests in slot 32 to sit at least generally within the confines of frame 14. Arm 12 can be secured in such a position, for example, by snapping into place or being held by a securing device, such as a magnetic lock. In some embodiments, arm 12 could have a handle for easy movement to and from an extended position.

By allowing arm 12 to move from an extended position and be secured to frame 12, apparatus 10 can be used as a compact apparatus with arm 12 in a stored position when second optical sensor 22 is not needed.

Figure 3A:
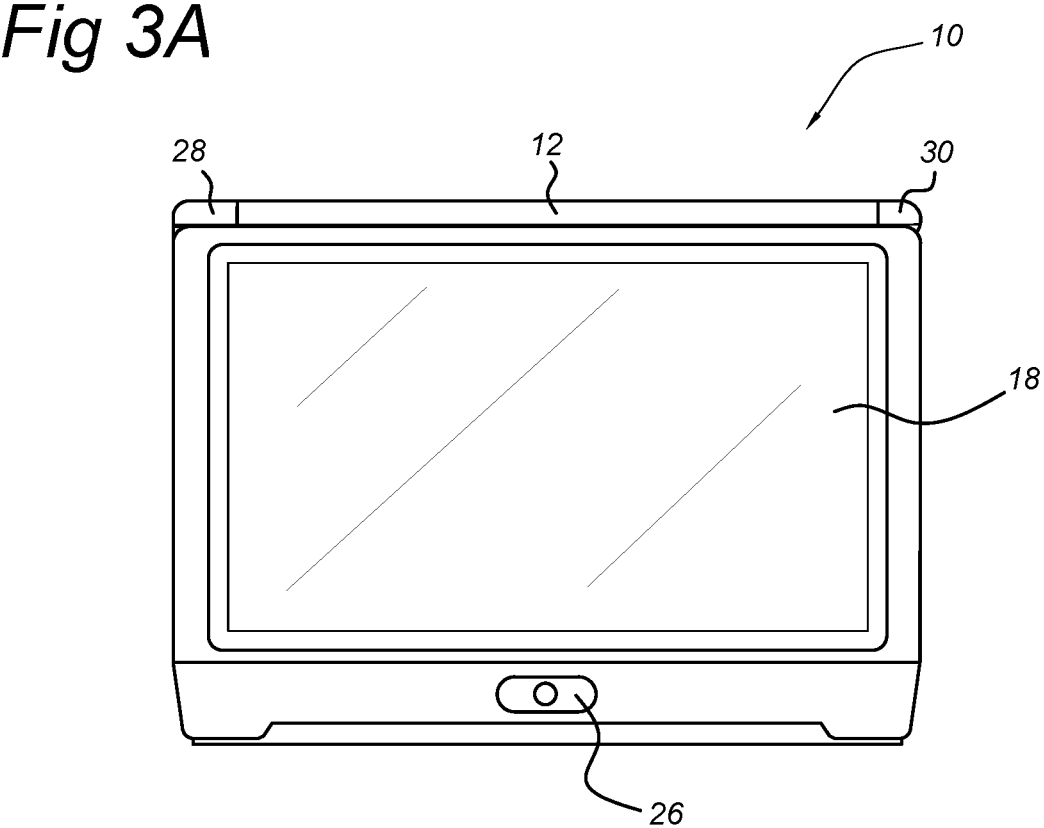
FIG. 3A shows a front view of the apparatus of FIG. 1A in a collapsed state.
Figure 3B:
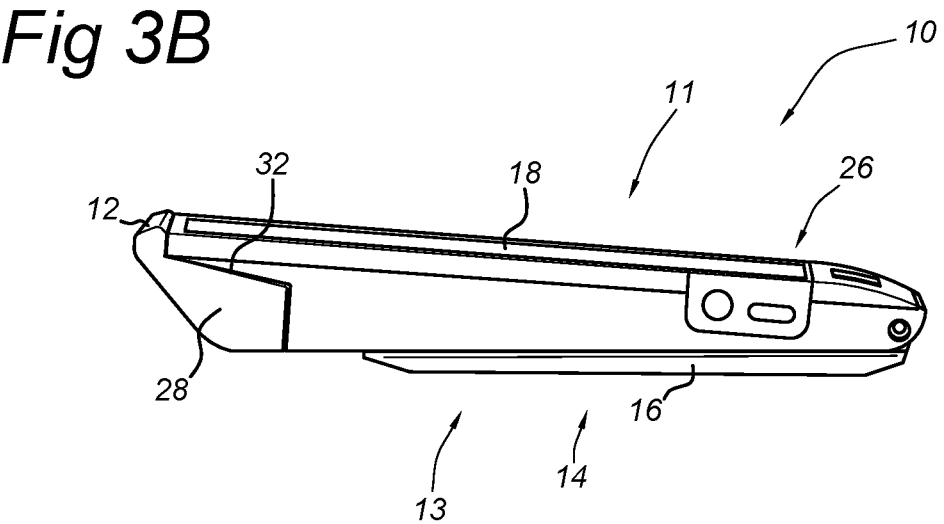
FIG. 3B shows a side view of FIG. 3A.

FIG. 3A shows a front view of the apparatus of FIG. 1A in a collapsed state. FIG. 3B shows a side view of FIG. 3A.

Apparatus 10 is able to be put into a compact package by collapsing frame 14 and putting arm 12 in a non-extended position. When fully collapsed, apparatus 10 is generally rectangular cuboid. Frame 14 is collapsed by rotating skids 16 to lie against the back side of apparatus 10, generally against another part of frame 14 or a back side of screen 18 depending on the specific configuration of apparatus 10.

By being able to collapse into a compact package, apparatus 10 is able to be easily stored and transported elsewhere when not in use.

By forming apparatus 10 with a plurality of optical sensors 20, 22, 24 and in a manner that it can be collapsed into a compact package, apparatus 10 is a versatile apparatus 10 for capturing and displaying a variety of different objects and can be easily taken to where it is needed. As apparatus 10 is generally used for helping persons with low vision, the ability of apparatus 10 to be transported and easily set up for use elsewhere ensures that low vision persons are able to capture and magnify images wherever they are and not only at home. Extendable arm 12 ensures that the compact size of apparatus 10 does not limit the ability to capture larger areas, as arm 12 can position second optical sensor 22 at a further distance from a surface for capturing larger area 23, which could be the size of a page or a newspaper, for example. This can also enable the use of apparatus 10 with OCR functions and/or capturing things that may not be easily captured by optical sensors only directed in front of apparatus 10, such as three dimensional objects or the handwriting of a user as they are writing.

As discussed in the background section, past systems that had larger display screens typically included a support on which the object is placed. Devices that were designed to be more compact could not capture a very large area due to the placement of the optical sensor on the frame. Thus, the past devices typically either required a large amount of space and were not truly transportable due to weight and size; or if they were transportable they were limited in what they could capture and display due to the compact size. Apparatus 10 overcomes these problems by having a fully collapsible, compact design; a plurality of optical sensors 20, 22, 24 for capturing different locations; and an extendable arm 12 for positioning an optical sensor 22 at a position to have a larger capture area 23 than if fixed to frame 14.

Apparatus 10 could also include light sources, for example, light emitting diodes ("LEDs"), that can be directed toward the same surface which one of optical sensors is directed toward. Different numbers and/or arrangements of light sources could be used.

While apparatus 10 has been shown to have three optical sensors 20, 22, 24; apparatus could have fewer optical sensors or more optical sensors depending on desired uses of apparatus 10.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. An apparatus comprising:
a frame;
a screen supported by the frame for displaying an image;
a first optical sensor for capturing an image;
an extendable arm having a first end and a second end, wherein the second end is connected to the frame; and
a second optical sensor connected to an underside of the first end of the extendable arm and configured for capturing an image; the extendable arm able to secure generally within the confines of the frame with the second optical sensor positioned behind the screen and oriented inwardly toward the frame in a storage position when not extended, rotatable with respect to the frame to a use position, the axis of rotation being perpendicular to the plane of the screen such that the second optical sensor is positioned to a side of the frame and the screen and is oriented toward a surface on which the apparatus is supported when in the use position, the second optical sensor being translatable between the storage and use positions via a single point of articulation.

2. The apparatus of claim 1, and further comprising:
a third optical sensor connected to the apparatus, wherein the first optical sensor is configured for capturing an image near to the apparatus and the third optical sensor is configured for capturing an image at a distance from the apparatus.

3. The apparatus of claim 1, wherein the arm is extendable to a use position such that the second optical sensor is positioned to capture an image to a side of the frame.

4. The apparatus of claim 1, wherein the first optical sensor is connected to a back surface of the screen or to a part of the frame positioned behind the screen.

5. The apparatus of claim 1, wherein the apparatus is configured to be collapsible into a compact package.

6. The apparatus of claim 5, wherein the compact package comprises the frame collapsing to lie adjacent to the screen and/or a part of the frame.

7. The apparatus of claim 6, wherein the compact package is substantially rectangular cuboid.

8. The apparatus of claim 6, wherein the frame comprises a slot extending along a length of the apparatus for securing the extendable arm to the frame in a compact state.

9. The apparatus of claim 1, wherein the extendable arm further extends with a slide.

10. The apparatus of claim 1, wherein the extendable arm is a length substantially equal to the length of the frame.

11. The apparatus of claim 1, wherein the frame comprises:
a skid on each side of the frame extendable in front of the frame for supporting the frame on a surface such that the first optical sensor is positioned to capture images of the surface between the two skids.

12. The apparatus of claim 1, further comprising a slot formed in the frame, the slot comprising a recessed portion adapted to fittingly receive the first end of the extendable arm whereby in the storage position the second optical sensor is disposed entirely within the recessed portion between the first end of the extendable arm and the screen.

13. A method of manufacturing an apparatus for displaying information on a screen, the method comprising:
connecting a screen to a frame such that the screen can be supported by the frame with respect to a surface;
connecting a first optical sensor to the apparatus such that it can capture information to display on the screen; and
connecting an extendable arm having a first end and second end to the frame at a-the second end such that the first end can rotate along an axis of rotation perpendicular to the plane of the screen to a use position to the side of the frame, the first end comprising an underside with a second optical sensor connected thereto such that the second optical sensor is oriented outwardly toward a surface on which the apparatus is supported when in the use position, wherein the extendable arm is able to secure generally within the confines of the frame with the second optical sensor positioned behind the screen and oriented inwardly toward the frame in a storage position when not extended, the second optical sensor being translatable between the storage and use positions via a single point of articulation.

14. The method of claim 13, and further comprising connecting the screen to the frame and connecting the extendable arm to the frame such that each can fold into a compact package.

15. The method of claim 13, and further comprising connecting a third optical sensor to the apparatus.

* * * * *